United States Patent [19]

Towlson

[11] 4,363,535
[45] Dec. 14, 1982

[54] LIGHT VALVE DISK ASSEMBLY AND METHOD OF ASSEMBLING THE SAME

[75] Inventor: Howard E. Towlson, Baldwinsville, N.Y.

[73] Assignee: General Electric Company, Portsmouth, Va.

[21] Appl. No.: 210,587

[22] Filed: Nov. 26, 1980

[51] Int. Cl.³ .............................................. G02F 1/29
[52] U.S. Cl. .................................................... 350/361
[58] Field of Search ......................................... 350/361

[56] References Cited
U.S. PATENT DOCUMENTS

3,489,940  1/1970  Towlson ............................. 350/361

Primary Examiner—William L. Sikes
Assistant Examiner—Léon Scott, Jr.

[57] ABSTRACT

A light valve includes a rotatable disk, having a light modulating fluid layer on a writing surface of the disk, mounted for rotation on a cover plate assembly which combines the functions of a disk drive support plate and a baffle plate for hydrodynamically isolating the writing surface of the disk from contaminated fluid in a sump. The cover plate assembly is mounted on a light output window by engaging the window against a shoulder formed on a mounting rim projecting from the cover plate assembly and surrounding the disk. This structure protects the disk from particulate matter during assembly and permits the use of an assembly procedure which is more rapid and less likely to damage the disk. A modification of the device includes metal spacers mounted on a second shoulder formed on the rim for establishing a capillary distance between the light output window and the other surface of the disk.

24 Claims, 9 Drawing Figures

LIGHT VALVE DISK ASSEMBLY AND METHOD OF ASSEMBLING THE SAME

BACKGROUND OF THE INVENTION

1. Field of the Invention

This invention relates to light valves for optical projection of images generated electronically on a fluid layer, and more particularly to light valves having an improved disk assembly and to an improved method of assembling the disk assembly.

2. Description of the Prior Art

One form of light valve suitable for optical projection of electronically generated images onto a remote display surface comprises an evacuated envelope containing an electron gun in alignment with a transparent disk. The disk is rotated through a reservoir of light modulating fluid to deposit a continuously replenished layer of fluid on the disk surface. An electron beam, generated by the electron gun, is directed through electrostatic beam deflecting and focusing means and is scanned across a portion of the light modulating fluid layer so as to selectively deform the layer. The fluid deformations thus formed constitute diffraction gratings which, in conjunction with a Schlieren optical system, selectively control passage of light from a light source through the disk and through an output window in the light valve envelope in order to create visible images at a remote display surface on which the light impinges.

Light valves of the type described have hitherto operated satisfactorily only for limited periods of time. Although the light modulating fluid is free from particulate contamination at the outset of light valve operation, a buildup of contamination occurs as operation of the light valve progresses. This contamination is due in part to the wear of moving parts within the light valve, as well as to the presence of impurities. In addition, some particles may be formed as a result of massive damage to fluid molecules caused by heavy electron or ion bombardment. Eventually, this contamination may reach a level which results in the deterioration of the displayed image.

To overcome the problem of contamination, it has been proposed in H. E. Towlson U.S. Pat. No. 3,489,940, assigned to the same assignee as the present application, to provide apparatus for hydrodynamically isolating the light modulating fluid layer on the disk from the contaminated, particulate-carrying sump fluid in order to prevent the sump fluid from mixing with the fluid layer on the disk surface. By situating a baffle plate in close parallel proximity to one side of the disk and dispensing fluid from a channel of predetermined configuration on the side of the baffle plate facing the disk, a low fluid flow rate is sufficient to maintain fresh filtered fluid within the entire region between the baffle plate and the disk. Only fresh filtered fluid is thus picked up by the disk even though the region between the baffle plate and the disk is situated within the sump.

In the device shown in said patent, and more particularly in the present commercial form of this device, the disk is mounted for rotation on bearing means supported on a disk drive support plate, which also supports the drive system for the disk. The disk drive support plate is a stamped sheet metal plate having feet which are springloaded against a face plate. The baffle plate is positioned between the disk and the disk drive support plate, which is parallel to the disk and baffle plate, but extends only partially over the disk. A light output window has one of its sides positioned in close parallel proximity to the other side of the disk and maintained a capillary distance therefrom by spacers in the form of frit dots fused to the window. The baffle plate is supported on spacers, each of which includes a laterally extending foot engaged with, and spring biased against, the other side of the window.

A number of problems have been faced in the assembly of this prior art device. Because the oil distribution gap between the disk and the baffle plate needs to be thin (about 0.010 inch) to prevent oil flow in from the surrounding sump area, the tolerances on all the parts, i.e., the light output window, the disk, the baffle plate and the spacer feet, are critical and must be held closely to prevent the disk from hitting the baffle plate. As the disk is positioned edgewise into the gap between the baffle plate and the light output window, there is the danger that the disk will rub against the edge of the baffle plate and cause a slight scratch or bruise on the surface of the disk, resulting in the rejection of the disk for use in the light valve apparatus.

After the disk is inserted in the gap, the disk drive support plate is positioned over the baffle plate and disk and is set into place. During this step, the exposed surface of the disk is frequently contaminated by particulate material falling on the disk. It is then necessary to disassemble the apparatus, reclean the disk, and reassemble the apparatus. Often, this procedure must be repeated several times. As a result, the time and cost of assembly is substantially increased.

Because the disk drive support plate is stamped from a metal sheet and has integral depending feet which are engaged against the face plate of the envelope of the light valve device, it has sufficient flexibility that accurate pitch spacing between the gear reduction system carried on the support plate and the ring gear mounted on the peripheral edge of the disk is difficult to maintain. This often leads to erratic disk motion.

SUMMARY OF THE INVENTION

Accordingly, it is an object of this invention to provide an improved light valve rotating disk assembly which avoids these drawbacks of the prior art.

It is a related object to provide an improved method of assembling a light valve disk assembly.

A more particular object relates to the provision of a light valve disk assembly in which the functions of the disk drive support plate and baffle plate are combined in a single cover plate assembly.

Another object involves the provision of improved means for mounting the cover plate assembly on the light output window which avoids the need for close tolerances.

An additional object relates to the provision of a structure which protects the disk from contamination during assembly.

A further object relates to the provision of improved means for spacing the rotating disk from the light output window.

Briefly, in accordance with a preferred embodiment of the invention, a light valve comprises a rotatable disk, a layer of light modulating fluid coated on a writing surface of the disk, a cover plate assembly combining the functions of a disk drive support plate and baffle plate, a light output window and a sump containing light modulating fluid, the rotatable disk, cover plate assembly and light output window being partially submerged in the sump. The cover plate assembly includes a cover plate portion having one side spaced in close proximity to the writing surface of the disk and serving as part of the apparatus for hydrodynamically isolating the light modulating fluid layer on the writing surface of the disk from the contaminated fluid in the sump. The cover plate assembly, upon which the drive means and bearing means for the disk are mounted, includes a peripheral rim projecting from the cover plate portion and surrounding the edge of the disk. The mounting rim includes a shoulder which abuts against one surface of the light output window facing the disk and is clamped thereagainst by a plurality of spring clips, engaging the opposite surface of the window and the other side of the cover plate portion; the location of the shoulder accurately determines the spacing between the one side of the cover plate portion and the one surface of the window. The gap between the other surface of the disk and the one surface of the window is maintained at a capillary distance by, in one embodiment, the provision of spacing means in the form of frit dots fused to the window. In a second embodiment, the spacing means is formed as spacing shims which are placed on a second shoulder provided on the mounting rim.

It will be observed that the disk will be substantially protected from contamination during assembly by the cover plate portion, the mounting rim which completely surrounds the disk, and the light output window. The only possible direct ingress of contaminants to the writing surface of the disk is through the aperture provided in the cover plate portion to permit the electron beam to impinge against the light modulating coating. According to another feature of the invention, this aperture may be covered during assembly, when the cover plate portion, disk and window are disposed horizontally, by providing a diaphragm dimensioned to cover the aperture. The diaphragm is loosely pivoted to the cover plate portion at a point below the bulk of the aperture when the apparatus is displaced in its operating position. By virtue of this arrangement, the diaphragm automatically pivots to uncover the aperture when the apparatus is moved from its horizontal assembly position to its operating position.

The bearing means for the rotatable disk includes a spring biased bearing which urges the disk into engagement with the spacing means when the device is in its operating position. During assembly, however, when the disk is disposed horizontally, the full weight of the disk and/or the force of the assembly worker's hand may overcome the strength of the bearing spring. In order to prevent the writing surface of the disk from being damaged by abutment with the cover plate portion, a step is provided at the corner between the mounting rim and cover plate portion. This step is engaged by the ring gear on the peripheral edge of the disk to support the disk and keep the writing surface of the disk separated from the cover plate portion.

In the method of assembling the light valve disk assembly of the invention, the cover plate assembly is assembled, cleaned and placed horizontally with the mounting rim and bearing means extending upwardly from the cover plate portion. The disk is cleaned and placed on the bearing means within the mounting rim. As the disk is inserted, it is tilted slightly to engage the ring gear on the disk with the drive pinion of the disk driving means. The ring gear on the disk may then abut the step on the cover plate assembly. The window is then engaged with the mounting shoulder on the rim and spring clips are applied to clamp the window against the shoulder. If the diaphragm is provided, it is pivoted over the aperture when the cover plate portion is placed horizontally. After the light valve disk assembly is completed and moved to its operating position, the diaphragm pivots to uncover the aperture.

The features of the invention believed to be novel are set forth with particularity in the appended claims. The invention itself, however, both as to organization and method of operation, together with further objects, features, and advantages thereof, may best be understood by reference to the following description taken in conjunction with the accompanying drawings.

DETAILED DESCRIPTION

Figure 1:
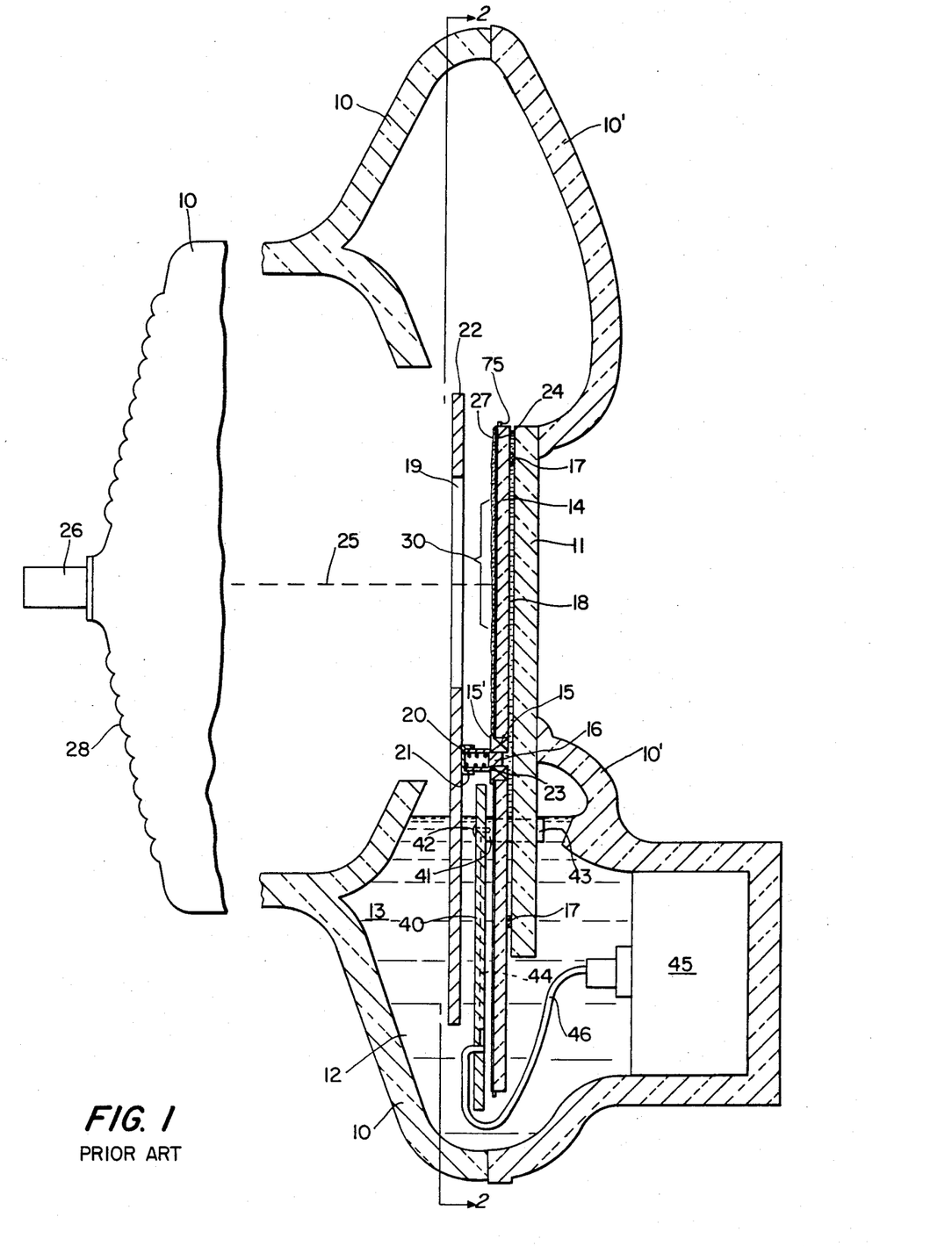
FIG. 1 is a partially cutaway side view along line 1—1 of FIG. 2 showing a light valve of the prior art.
Figure 2:
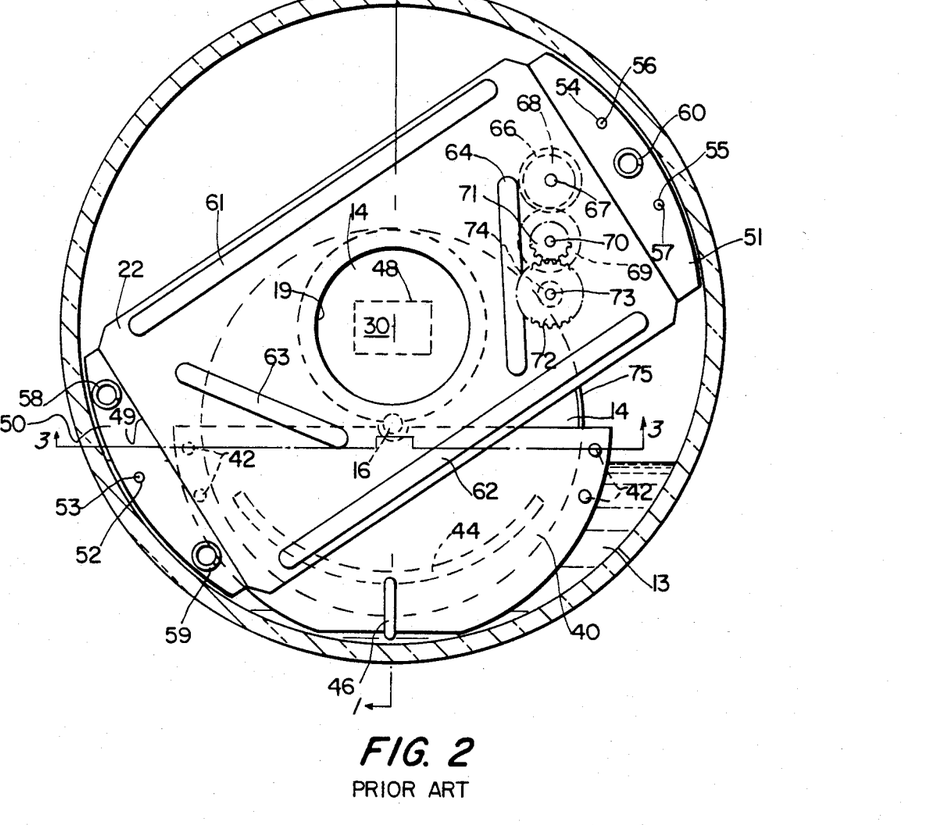
FIG. 2 is a sectional view taken along line 2—2 of FIG. 1.
Figure 3:
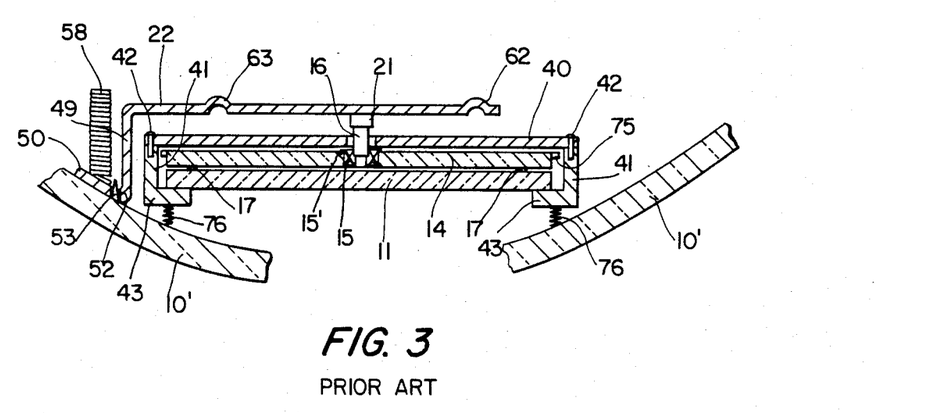
FIG. 3 is a sectional view taken along line 3—3 of FIG. 2.
Figure 4:
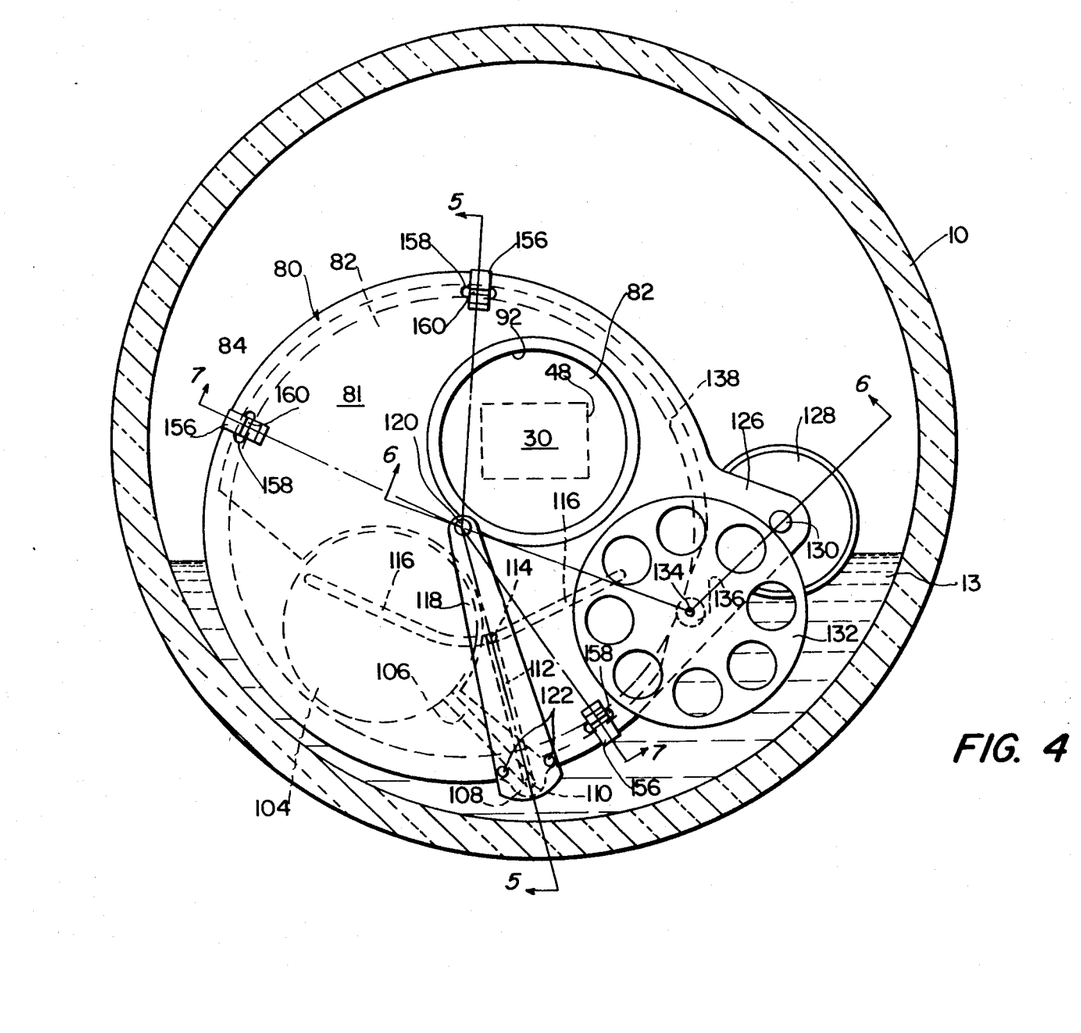
FIG. 4 is a sectional view, similar to the view of FIG. 2, showing a light valve of the present invention.

FIGS. 1, 2 and 3 illustrate a light valve of the prior art containing hydrodynamic contaminant isolation means. The light valve comprises an envelope 10, typically comprised of glass, containing a light output window portion 11 and a sump region 12 holding a reservoir of light modulating fluid 13. The interior of envelope 10 is evacuated to a low gas pressure.

The light modulating fluid is typically of the polybenzyltoluene type having a fluid viscosity of 1,000 centistokes at 60° C., with a vapor pressure in the range of $10^{-9}$-$10^{-10}$ torr. The fluid contained in sump region 12 is that which has drained off an optically transparent disk 14 which is continuously rotated on bearing 15 about a shaft 16, typically at a speed in the order of 3 revolutions per hour. A spring 20 is maintained in compression by having its cap 21 affixed to a disk drive support plate 22 which, in turn, is affixed to envelope 10 of the light valve as will be described below. The opposite end of spring 20 bears against the body of shaft 16. Consequently, a shoulder 23 on shaft 16 urges bearing 15, which has a flange 15', to force disk 14 against a plurality of protuberances 17, which may advantageously be formed of fritted glass droplets. These protuberances are affixed to output window 11.

Disk 14 is spaced apart from light output window 11 by a distance of about 3 mils so as to permit fluid 18 from sump 12 to rise by capillary action and fill the region between the disk and the output window. The 3 mil spacing is maintained by protuberances 17, as described in greater detail in H. E. Towlson U.S. Pat. No. 3,385,991, assigned to the instant assignee. As pointed out in the aforementioned Towlson patent, adverse effects produced by either a non-uniform fluid coating on the output surface of the rotatable disk, or by fluid condensate or droplets on the output window, are thereby eliminated.

A thin film 24, which comprises a transparent conductive coating such as indium oxide, forms a writing surface on rotating disk 14. Coating 24 may be maintained at any desired potential since a conductive path is formed through bearing 15, shaft 16, spring 20, cap 21 and member 22, permitting a continuous electrical connection to coating 24 through a stationary connection (not shown) which may be made to disk drive support plate 22. An aperture 19 in plate 22 permits passage of an electron beam 25, originating at an electron gun 26, to be directed toward conductive coating 24 on disk 14. Disk 14 itself is non-conductive, and preferably is comprised of glass.

A thin film of light modulating fluid 27 is coated on thin film 24 and thus is situated in the direct path of electrons in electron beam 25. Beam 25 is focused and deflected by electron optical means (not shown) within the light valve and hence is swept, in raster fashion, over the surface of light modulating fluid layer 27. The pattern of charges on layer 27 produced by electron beam 25 causes corresponding deformations in the thickness of layer 27, resulting in the formation of diffraction gratings 30. These gratings correspond to the image to be projected onto a remote display surface. Light from a light source (not shown) positioned behind electron gun 26 impinges upon a lenticular lens system 28 formed on the rear wall of envelope 10 and is directed by the lenticular lens system through aperture 19 onto diffraction gratings 30.

By modulation of electron beam 25 through application of suitable potentials to the electrostatic focus and deflection means, diffraction gratings 30 in fluid layer 27 are selectively controlled. Consequently, light passing through transparent rotatable disk 14 and output window 11 is selectively controlled and, in conjunction with externally located lenses of a Schlieren optical system (not shown) is projected on a remote display surface (not shown) to form an image representative of the intelligence modulating the electron beam.

A baffle plate 40, situated within sump 12, is spaced in close proximity and parallel to disk 14. The spacing and orientation of baffle plate 40 with respect to disk 14 are maintained by spacers 41, which are affixed to baffle plate 40 by means of screws 42. Each of the spacers 41 has a laterally extending foot 43 which engages the side of window 11 facing away from disk 14. Springs 76 extend between the face plate 10' of the envelope and feet 43 to bias feet 43 into engagement with window 11. The separation maintained between baffle plate 40 and disk 14 is typically in the order of 10–15 mils.

Fluid convening means 44 is disposed in predetermined configuration on the side of baffle plate 40 facing disk 14. This configuration is such as to permit flow of fresh filtered fluid outward in all directions parallel to the plane of disk 14, so as to maintain the entire region between disk 14 and output window 11 filled with fresh filtered fluid only. By continuing to supply fresh filtered fluid from a pump and filter 45, shown in FIG. 1, through a closed tube 46 to arcuate fluid conveying means 44, fluid pressure in the region between baffle plate 40 and disk 14 is maintained sufficiently high to prevent contaminated fluid from sump 12 from entering this region. Accordingly, as disk 14 rotates, transparent coating 24 is continually covered with fresh filtered fluid only, since the surface of coating 24 does not contact any of the contaminated fluid in sump 12.

Fluid conveying means 44 comprises an open channel recessed within the baffle plate so as to avoid any projecting surfaces on the baffle plate 40 which might impede flow of fresh filtered fluid in any of the directions parallel to the plane of disk 14. This also helps to avoid turbulence in the outward flow of fluid from conveying means 44. Such turbulence could have the undesirable effect of mixing contaminated fluid from sump 12 with the fresh filtered fluid emerging from fluid conveying means 44, thereby adding contaminants to fluid layer 27.

A raster area 48 on oil film 27, which is the region upon which electron beam 25 may impinge to form diffraction gratings 30, is illustrated in its relative position on disk 14 in FIG. 2. Although raster area 48 is shown as a discrete area, and is fixed with respect to output window 11, those skilled in the art will recognize that the raster area on disk 14 constitutes a circular band, due to the continuous rotation of the disk. Accordingly, with respect to disk 14, area 48 is merely an instantaneous region which conveniently aids in describing operation.

By spacing baffle plate 40 at a distance of only 10-15 mils from disk 14, only a very small flow rate, of the order of 3 cubic centimeters per minutes, is required to maintain the entire submerged surface of transparent conductive coating 24 covered with only fresh filtered fluid. This low volume and low flow rate necessitate but a small fluid pump and small filter capacity, enabling the pump and filter to be situated within envelope 10 of the light valve. The pump may be driven by a magnetic coupling (not shown) through glass face plate 10', so that no external mechanical connection need be made to the pump and filter. The action of the magnetic coupling on the pump of pump and filter means 45, moreover, is such as the attract the pump tightly against face plate 10' at the region where the magnetic coupling is being made, so that no additional means are required to maintain pump and filter means 45 in proper position.

Referring to FIG. 2, disk drive support plate 22 is made of stamped metal and is bent to provide a pair of mounting feet 50 and 51. As seen in FIG. 3, each foot is supported by a vertical leg portion 49. Foot 50 includes a hole 52 which is positioned over a cone 53 integral with the envelope. A pair of holes 54 and 55 extend through foot 51 and are positioned on cones 56 and 57. A pair of compression springs 58 and 59 extend from a portion of envelope 10 and spring load foot 50 against face plate 10'. Likewise, a single compression spring 60 spring loads foot 51 against the face plate. In order to strengthen support plate 22, a plurality of ribs 61, 62, 63 and 64 are formed therein.

A drive magnet 66 is magnetically coupled through face plate 10' to a drive motor in the same manner as the pump magnet. The shaft 67 of magnet 66 carries a gear 68 which drives a gear 69 on shaft 70. A gear 71 on shaft 70 engages gear 72 on shaft 73, carrying a drive pinion 74, which drives a ring gear 75 mounted on the peripheral edge of disk 14 to drive the disk for rotation about bearing 15. This disk drive system is supported on support plate 22.

The prior art device of FIGS. 1-3 is assembled by first mounting baffle plate 40 on output window 11 by means of spacers 41. Because the gap between baffle plate 40 and disk 14 is only about 10 mils, great care must be given to the tolerances of output window thickness, disk thickness, baffle surface, and spacer foot position. Otherwise, disk 14 will hit baffle plate 40 and be damaged. Glass disk 14 is inserted edgewise into the gap between baffle plate 40 and window 11, and it is easily damaged by rubbing against the edge of baffle plate 40. It would then be unsuitable for use in the light valve.

In order to avoid degradation of picture quality, the disk writing surface (the whole surface the electrons impinge upon) must be maintained as clean as possible. To this end, each of the parts must be carefully cleaned before assembly. After disk 14 has been inserted in the gap, disk drive support plate 22 is positioned over the disk, engaging disk 14 on bearing 15 on shaft 16 and engaging ring gear 75 with pinion 74 of the drive train. The support plate is set into place by engaging foot 50 with positioning cone 53 and foot 51 with positioning cones 56 and 57. During these steps, particulate material will frequently fall on disk 14, which is largely exposed; and it then becomes necessary to disassemble the apparatus, reclean the parts, and reassemble them. It is often necessary to repeat this procedure several times. As a result, the time and cost of assembly is increased.

Support plate 22 is stamped from sheet metal and is inherently flexible. This has made it difficult to maintain accurate pitch spacing in the gear train to ring gear 75. This problem, which is contributed to by the practice of adjusting the spacing of support plate 22 from face plate 10' by adjusting the length of mounting leg portion 49, leads to erratic motion of the disk.

The prior art light valve device of FIGS. 1-3 has been modified, according to the invention, to avoid these problems. Referring to FIGS. 4, 5, 6 and 7, a light valve of the invention includes a cover plate assembly 80 which combines the functions of the disk drive support and baffle plates of the prior art device, a rotatable disk 82, a light output window 84, and a face plate 86, forming the front portion of envelope 10. Cover plate assembly 80, which preferably is vacuum cast or machined from titanium, stainless steel, or aluminum, has a flat cover plate portion 81 and a mounting rim 150, which will be described in more detail hereinafter.

Rotatable disk 82 is optically transparent and is formed of glass. A thin film 88 of a transparent conductive coating, such as indium oxide, forms a writing surface on disk 82. As in the prior art device of FIGS. 1-3, this coating may be maintained at any desired potential through a conductive path provided through the bearing and shaft for disk 82 and cover plate assembly 80. A thin layer 90 of light modulating fluid is coated on thin film 88 and is thus situated to be in the direct path of the electron beam from the electron gun (not shown). For this purpose, cover plate portion 81 is provided with an aperture 92 through which the electron beam is directed. As is the case with the prior art device of FIGS. 1-3, the beam is swept in raster fashion over the surface of light modulating fluid layer 90. The resulting pattern of charge on layer 90 causes corresponding deformations in the thickness of the layer to form diffraction gratings 30 which correspond to the image to be projected, as explained with reference to the abovedescribed prior art device, upon a display screen.

Rotatable disk 82 is mounted for rotation on a bearing assembly projecting from cover plate portion 81. This bearing assembly includes an integral boss forming a shaft 98, an annular recess or well 94 surrounding the shaft, a spring 96 slipped over shaft 98 and seated in well 94, and a bearing 102 upon which disk 82 is mounted. Bearing 102 has a flange 103 bearing against the film 88 on disk 82. Spring 96 is of sufficient strength to bias bearing 102 and disk 82 toward light output window 84 when the disk is in its normal generally vertical operating position. However, as explained more fully hereinafter, spring 96 may be overcome by the weight of disk 82 and/or by a force applied by an assembly worker when it is disposed horizontally during assembly.

The fluid conveying system includes a pump and filter 104 received in a well formed in face plate 86 and driven in the manner described for pump and filter 45 of the prior art device. A tube 106 receives the filtered output fluid from pump and filter 104 and is inserted in a hole 110 provided through a cover plate extension 108 to direct the fluid into a groove 112 formed on the far side of cover plate portion 81. Groove 112 is closed by a flat cover member 118 to form a fluid conduit communicating through a hole 114 to an arcuate groove 116, which is about 100 mils wide, on the side of cover plate 81 facing disk 82. It will be noted that cover member 118 is secured to cover plate portion 81 by means of a screw 120 engaged with a threaded bore 121, which extends through plate portion 81 and shaft 98, and a pair of screws 122. Cover plate portion 81, rotatable disk 82, and window 84 are partially immersed in the fluid 13 contained in sump 12. The cover plate portion 81 and disk 82 are in substantially parallel close proximity, about 13-20 mils apart, to define a predetermined volume of fluid adjacent the surface of disk 82 carrying the light modulating fluid layer 90. The flow of fluid is at a rate sufficient to hydrodynamically isolate the light modulating fluid layer 90 from contaminated fluid in sump 12.

As mentioned above, disk 82 is biased by spring 96 toward light output window 84. In order to maintain a capillary distance of about 3 mils between disk 82 and light output window 84, frit dots or protuberances 124 are fused to the surface of window 84 facing disk 82. As known in the art, this avoids adverse effects caused by a non-uniform coating on the outside surface of disk 82 or by fluid condensate or droplets on the output window.

Figure 6:
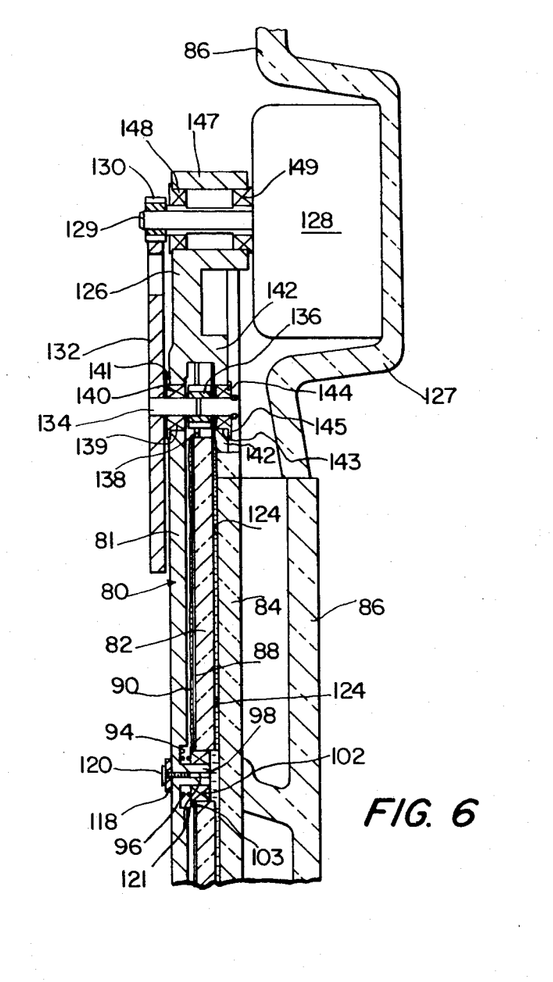
FIG. 6 is an enlarged sectional view taken along line 6—6 of FIG. 4.

The drive system for disk 82 is mounted on cover plate assembly 80. For this purpose, a mounting ear 126 extends from one side of cover plate portion 81. A drive magnet 128 is housed in a well 127 formed in face plate 86 and is driven by magnetic coupling through the end wall of well 127 by a complementary magnet (not shown). The shaft 129 of magnet 128, which is journaled in bearings 148 and 149 supported in a sleeve 147 projecting from cover plate portion 81 (FIG. 6), mounts a gear 130 meshed with a gear wheel 132. The shaft 134 of gear wheel 132 is journaled in a pair of flanged bearings 140 and 144. Bearing 140 is mounted in a hole 139 in, and its flange 141 engages the rear (left as seen in FIG. 6) surface of, cover plate portion 81. Bearing 144 is mounted in a hole 143 in a bracket 142 extending forwardly of cover plate portion 81 and has a flange 145 engaging the forward surface of bracket 142. A drive pinion 136 on shaft 134 is meshed with and drives a ring gear 138 mounted on the peripheral edge of disk 82.

Figure 5:
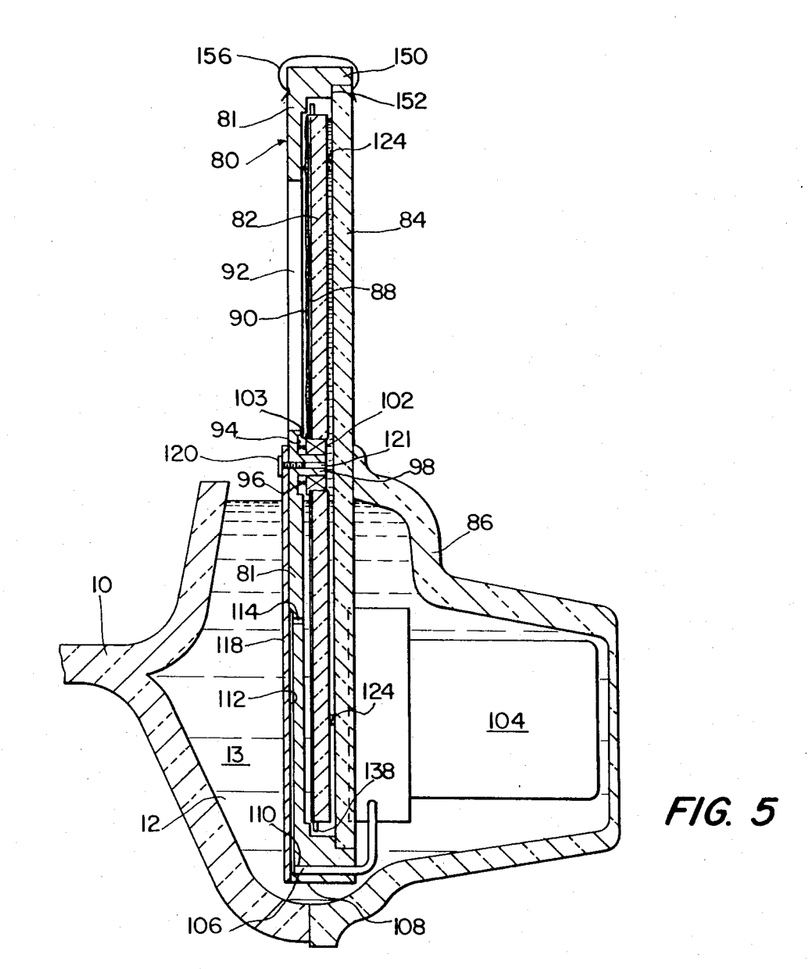
FIG. 5 is an enlarged sectional view taken along line 5—5 of FIG. 4.
Figure 7:
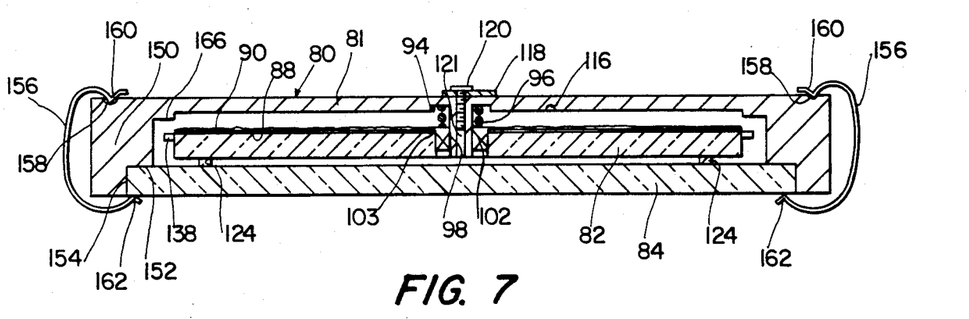
FIG. 7 is an enlarged sectional view taken along line 7—7 of FIG. 4.

As best seen in FIG. 7, rim 150, which projects forwardly from the edge of cover plate portion 81, includes a mounting shoulder 152 dimensioned to receive light output window 84 with an inside wall 154 engaging the peripheral edge of the window. The width of shoulder 52, which is typically about 100 mils, should not be less than 50 mils. In order to clamp window 84 to cover plate assembly 80, three spring clips 156 are provided. These clips are formed with a projection 160, which is engaged in a shallow recess 158 in the rear surface of cover plate assembly 80, and a projection 162, which engages the forward surface of window 84. As seen in FIG. 5, window 84 is fused to, and supported on, face plate 86 of envelope 10. With this mounting arrangement, the distance between the rear surface of window 84 and the front surface of cover plate portion 81 is governed by the distance between shoulder 152 and the forward surface of cover plate portion 81, which distance is typically in the range 136–143 mils. Since cover plate assembly 80 is either vacuum cast or machined, this distance is established accurately. As already explained, the 3 mil distance between disk 82 and window 84 is accurately established by frit protuberances 124. Thus, the 13–20 mil gap between the forward surface of cover plate portion 81 and disk 82 is accurately established. It is to be noted that this accurate spacing is attained without any reference to the thickness of window 84, which is no longer critical.

As alluded to above, spring 96 is strong enough to bias disk 82 against frit spacers 124 when the disk is in its vertical operating position. When, however, the disk assembly is assembled, cover plate assembly 80 is placed horizontally with the rim 150 and shaft 98 projecting upwardly. When disk 82 is then mounted on bearing 102, the weight of disk 82 and/or a force applied by an assembly worker may overcome the force of spring 96 and move the disk towards the facing surface of cover plate portion 81. If contact is made between the writing surface of disk 82 and the facing surface of cover plate portion 81, the writing surface of the disk may be damaged. In order to avoid this, a step 166 is provided at the corner between rim 150 and cover plate portion 81 to keep disk 82 from touching cover plate portion 81. Step 166, which is about 5 mils thick, is dimensioned to engage with ring gear 138.

It has been found that the frit protuberances 124 used in the embodiment of FIGS. 4–7, as well as in the prior art device, to maintain the desired spacing between disk 82 and window 84 are sometimes troublesome. In order to adjust the spacing between disk 82 and window 84, it is necessary to work the frit protuberances with a grinder and hand lapping. There is a tendency for the protuberances to break off. They also contribute to the undesirable particulate level in the apparatus. These problems are avoided by the modification shown in FIG. 8.

Figure 8:
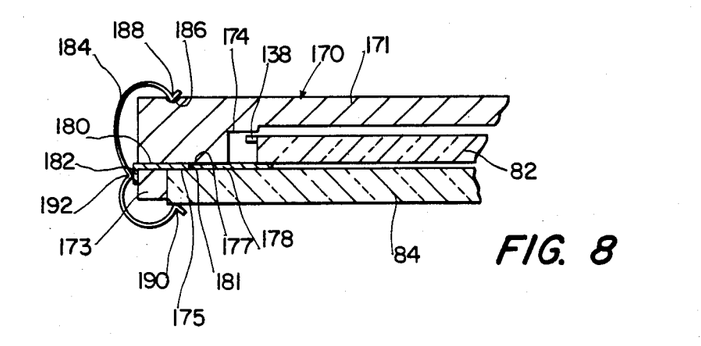
FIG. 8 is an enlarged partial sectional view, similar to FIG. 7, showing a modification of the invention.

Referring to FIG. 8, the modified cover plate assembly 170 includes a cover plate portion 171 and a rim 173 projecting from one side of cover plate portion 171. A mounting shoulder 175 is engaged by light output window 84 to establish the spacing between the rear side of window 84 facing disk 84 and cover plate portion 171. Frit protuberances are no longer provided on this rear side of window 84. The spacing function of the frit protuberances is provided instead by a plurality of metal shims or spacers 178 positioned on a second shoulder 177 formed on rim 173. A slot 180 is provided in alignment with the space between the plane of shoulder 175 and shoulder 177 and extends through the outer wall of rim 173. Shims 178, which are preferably formed of titanium or tungsten, are about 50 mils wide and extend through slot 180 to the outer surface of rim 173. A tab 182 is formed at the outer end of shim 178 in engagement with the outer surface of rim 173. The assembly is clamped together with spring clips 184, one of which is shown in FIG. 8. Clip 184 is formed with a projection 188 engaged in a depression 186 on the rear surface of cover plate portion 171 and a projection 190 engaging the forward surface of window 84. In order to hold shim 178 in place, clip 184 includes an additional bend forming a projection 192 engaging the outer surface of tab 182 and pressing tab 182 against the outer surface of rim 173. The inner end of shim 178 extends beyond the peripheral edge of disk 82 to provide the desired 3 mil spacing between disk 82 and window 84. As with the frit protuberance spacers, shims 178 engage disk 82 as it rotates. In order to reduce the area of contact between shims 178 and disk 82, the shims may be slightly deformed at selected points to form protuberances engaging disk 82. Cover plate assembly 170 also includes a step 174 which, as explained above with reference to step 166, serves to engage ring gear 138 to support disk 82 during assembly and prevent the writing surface of disk 82 from coming into contact with cover plate portion 171.

It is to be noted that, in both the embodiment of FIGS. 4–7 and in the modification of FIG. 8, the rim extends completely around the peripheral edge of disk 82. With outwindow 84 engaged with the mounting shoulder, the disk 82 is almost completely enclosed by cover plate assembly 80 and window 84 and thus substantially protected from particulate material during assembly. The only direct ingress to the writing surface of the disk for particulate material is through aperture 92. In the modification shown in FIG. 9, this opening is also closed during assembly. An aperture cover diaphragm 194, which is dimensioned to cover aperture 92, is loosely pivoted to cover plate portion 81 by means of a mounting extension 196 loosely journaled on a screw 198 extending through cover element 118 and engaged with threaded bore 121 (not seen in FIG. 9). Screw 198, which replaces screw 120 of the embodiment of FIGS. 4–7, includes a pair of shoulders (not shown) for receiving cover element 118 and cover diaphragm 194, respectively. As will be apparent from FIG. 9, which depicts the cover plate portion 81 in its normal vertical operating position, pivot screw 198 is positioned below the bulk of aperture 92. When cover plate portion 81 is in the horizontal position during assembly, cover diaphragm 194 is manually pivoted to cover aperture 92 to completely enclose disk 82 and protect it from particulate material. When the disk assembly is then moved to its vertical operating position, the loosely pivoted cover diaphragm 194 then pivots automatically through the force of gravity to uncover aperture 92 as seen in FIG. 9.

Figure 9:
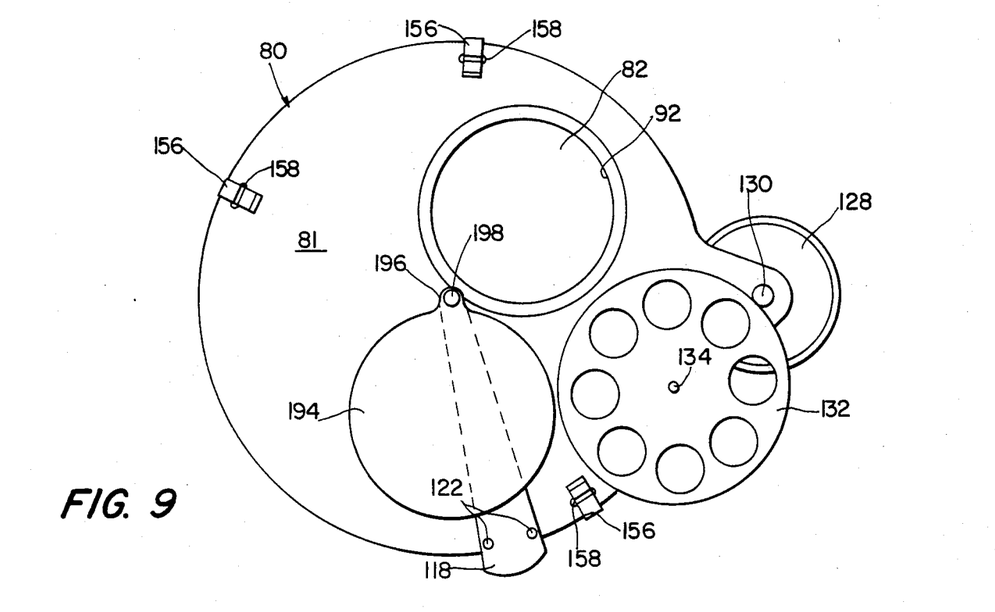
FIG. 9 is an elevation view showing another modification of a light valve disk assembly in its operative position.

The novel structural concepts of the disk assembly of the invention, as illustrated by the embodiment of FIGS. 4–7 and the modifications of FIGS. 8 and 9, make it possible to revise and improve upon the assembly procedure required for the prior art device as described above. In the assembly method of the present invention, cover plate assembly 80 is cleaned by washing it with detergent in an ultrasonic cleaner, vacuum firing to drive off volatile contaminants and again washed in an ultrasonic cleaner. The elements of the drive train, including magnet 128, gear 130, gear wheel 132, pinion 136 and bearings 148, 149, 140 and 144, are cleaned in the same way. The same cleaning procedure is followed for bearing subassembly parts spring 96 and bearing 102 and also for window 84 and face plate 86 to which window 84 had been already fused. The elements of the drive train are then mounted on cover plate assembly 80. Disk 82 is cleaned with a mild detergent, rinsed with distilled water, and subjected to a vapor rinse of isopropyl alcohol to remove the distilled water. All of these parts are then given a final cleaning by blowing them off with a filtered air stream to remove any particles which may be dropped on the surfaces. The critical area, i.e., the surfaces of disk 82, light output window 84, and the inside surface of cover plate portion 81 are then inspected in a darkened room with a high intensity microscope light directed obliquely across the surfaces and recleaned if required.

The parts are then ready for assembly. Cover plate assembly 80 is placed horizontally with mounting rim 150 projecting upwardly. If cover diaphragm 194 (FIG. 9) is used, it is manually pivoted over aperture 92. (In the assembly of the modification of FIG. 8, spacer shims 178 are now partially inserted in slots 180.) Spring 96 is slipped over shaft 98 and seated in well 94. Bearing 102 is placed on shaft 98. Disk 82 is then placed upon bearing 102. As disk 82 is inserted, it is tilted at a slight angle to slip ring gear 138 beneath bracket 142 into engagement with pinion 134. Because the strength of spring 96 is not sufficient to support the weight of disk 82, and/or a force applied by the assembly worker, disk 82 may drop until ring gear 138 engages step 166, which protects the writing surface of disk 82 from contact with the facing surface of cover portion 81. (In the assembly of the FIG. 8 modification, shims 178 are now fully inserted to extend partially over the edge of disk 82. Light output window 84 is then placed on mounting shoulder 152 (or 175 in the modification of FIG. 8). As mentioned above, face plate 85 is fused to window 84 and will, at this time, be above the window. The assembly worker then grasps the disk assembly by hand and turns it over. Spring clips 156 are then applied with pliers. Face plate 86 is then butted against envelope funnel 10 in a jig to complete the enclosure. In the case of the modification of FIG. 9, when the disk assembly is moved to its normal operating position, cover diaphragm 194 pivots by the operation of gravity to uncover aperture 92. Before face plate 86 is fused to envelope funnel 10, the device is given an overall optical inspection using the Schlieren optical system of the light valve.

Whereas the assembly time of the prior art device is often an hour or more, the assembly time after cleaning of the device of the invention, and its modifications, as shown in FIGS. 4-9, is only about three minutes. Because the disk is substantially protected from particulate material once the window is applied to the mounting shoulder, it is rarely necessary to disassemble the disk assembly to reclean the parts. This avoids additional assembly time and added opportunities to damage the disk. Because the disk need no longer be inserted edgewise into a narrow gap, the frequency of damage to the disk is reduced. Indeed, the assembly experience with devices of the invention indicates an increase in yield of about 20%. The apparatus and method of the invention provide for rapid assembly and protection of the disk from contamination by particulate matter once the window is applied to the mounting shoulder.

Because the drive train is no longer mounted on an inherently flexible sheet metal support as in the prior art device, but on a relatively rigid cast or machined cover plate which is mounted directly to the output window, accurate pitch spacing is easily maintained. The disk is therefore uniformly driven, and the erratic disk motion of the prior art device is avoided.

While only certain preferred features of the invention have been shown by way of illustration, many modifications and changes will occur to those skilled in the art. It is, therefore, to be understood that the appended claims are intended to cover all such modifications and changes as fall within the spirit and scope of the invention.

I claim:

1. A light valve, comprising:
   a rotatable disk having at least one writing surface with a layer of light modulating fluid coated on said writing surface, a portion of the disk being submerged in a sump containing light modulating fluid;
   apparatus for hydrodynamically isolating the light modulating fluid on said writing surface from said sump fluid to prevent sump fluid from coating said writing surface, said apparatus comprising a cover plate assembly having a cover plate portion at least partially submerged in said sump and spaced in close proximity and parallel to said writing surface of said disk to define a predetermined volume of fluid adjacent said writing surface, and said apparatus further comprising fluid conveying means communicating with said volume and furnishing fresh filtered fluid thereto to prevent any of said sump fluid from entering said volume;
   drive means for rotating said disk, said drive means being mounted on said cover plate assembly; and
   bearing means for said disk, said bearing means being mounted on said cover plate assembly.

2. A light valve as recited in claim 1, further comprising a light output window spaced in close proximity and parallel to the other surface of said disk, and wherein said cover plate assembly includes mounting means for mounting said cover plate assembly on said light output window.

3. A light valve as recited in claim 2, wherein said mounting means comprise a rim projecting from said cover plate portion, said rim including shoulder means defining a ledge engaging the peripheral edge portion of the side of said window facing said disk and a wall portion engaging the peripheral edge of said window.

4. A light valve as recited in claim 3, further comprising clamp means for maintaining said cover plate assembly in engagement with said window.

5. A light valve as recited in claim 4, wherein said clamp means comprises a plurality of spring clips.

6. A light valve as recited in claim 1, wherein said fluid conveying means includes a groove on the side of said cover plate portion facing away from said disk, said groove extending inwardly from the edge of said cover plate portion, and a cover element secured to said side of said cover plate portion covering said groove to form a fluid duct, said groove communicating with a hole extending through said cover plate portion, said hole feeding a pair of arcuate open fluid conveying channels on the side of said cover plate portion facing said disk.

7. A light valve disk assembly comprising:
   a rotatable disk having at least one writing surface with a layer of light modulating fluid coated on said writing surface;
   a light output window spaced in close proximity and parallel to the other surface of said disk;
   a cover plate assembly having a cover plate portion spaced in close proximity and substantially parallel to said writing surface of said disk to define a predetermined volume of fluid adjacent said writing surface of said disk when said disk and cover plate portion are partially submerged in light modulating fluid;

drive means for rotating said disk, said drive means being mounted on said cover plate assembly;

bearing means for said disk, said bearing means being mounted on said cover plate assembly; and mounting means for mounting said cover plate assembly on said light output window, said mounting means comprising a rim projecting from said cover plate portion, said rim including shoulder means defining a ledge engaging the peripheral edge portion of the side of said window facing said disk.

8. A light valve disk assembly as recited in claim 7, further comprising clamp means for maintaining said cover plate assembly in engagement with said window.

9. A light valve disk assembly as recited in claim 8, wherein said clamp means comprises a plurality of spring clips.

10. A light valve disk assembly as recited in claim 8, further comprising spacer means for maintaining a predetermined space between said disk and said window.

11. A light valve disk assembly as recited in claim 10, wherein said spacer means comprises protuberances integral with said window.

12. A light valve disk assembly as recited in claim 10, wherein said spacer means comprises spacer elements, said spacer elements being received upon second shoulder means provided in said rim.

13. A light valve disk assembly as recited in claim 12, wherein said rim further comprises a plurality of aperture to receive said spacer elements, said spacer elements extending through said apertures and having end tab portions engaged with the outer surface of said rim.

14. A light valve disk assembly as recited in claim 13, wherein said clamp means comprises a plurality of spring clips, each clip including a portion engaging one of said end tab portions.

15. A light valve disk assembly as recited in claim 10, wherein said bearing means comprises spring means for biasing said rotatable disk into engagement with said spacer means, wherein a ring gear is mounted on the peripheral edge of said disk, and wherein said cover plate portion includes a stepped ridge adjacent said rim for supporting said ring gear at the peripheral edge of said disk during assembly to keep said writing surface of said disk out of engagement with said cover plate portion.

16. A light valve disk assembly as recited in claim 7, wherein said rim completely encloses the peripheral edge of said disk to protect said disk from contaminants during assembly.

17. A light valve disk assembly as recited in claim 7, wherein said cover plate portion includes an aperture permitting passage of an electron beam to said writing surface of said disk, and wherein a cover diaphragm dimensioned to cover said aperture is loosely pivoted on said cover plate portion at a point below the bulk of said aperture when said cover plate portion is disposed in its operating position, said diaphragm being positionable over said aperture when said cover plate portion is disposed horizontally during assembly to protect said disk from contaminants and pivoting to uncover said aperture when said cover plate portion is disposed in said operating position.

18. A light valve disk assembly comprising:
a rotatable disk having at least one writing surface with a layer of light modulating fluid coated on said writing surface, a portion of said disk being submerged in light modulating fluid;

a light output window spaced in close proximity and parallel to the other surface of said disk;

a cover plate assembly having a cover plate portion spaced from and substantially parallel to said writing surface of said disk, said disk being mounted for rotation on said cover plate portion;

mounting means for mounting said cover plate assembly on said light output window, said mounting means including first shoulder means defining a ledge engaging the peripheral edge portion of the side of said window facing said disk; and spacer means for maintaining a space having a predetermined capillary distance between said disk and said window to cause said light modulating fluid to fill said space, said spacer means being received upon second shoulder means provided in said mounting means.

19. In a light valve disc assembly containing a rotating disk having at least one writing surface, a layer of light modulating fluid on said writing surface, a cover plate facing and spaced from said writing surface of said disk, and an aperture through said cover plate permitting passage of an electron beam to said writing surface of said disk, the improvement comprising:

a cover diaphragm dimensioned to cover said aperture loosely pivoted on said cover plate at a point below the bulk of said aperture when said cover plate is disposed in its operating position, said diaphragm being positionable over said aperture during assembly to protect said disk from contaminants and pivoting to uncover said aperture when said cover plate is disposed in its operating position.

20. A method of assembling a light valve disk assembly containing a rotatable disk having at least one writing surface for supporting a layer of light modulating fluid on said writing surface, said disk having a peripheral ring gear, a light output window spaced in close proximity and substantially parallel to the other surface of said disk, a cover plate assembly having a cover plate portion spaced in close proximity and substantially parallel to said writing surface of said disk to define a predetermined volume of fluid adjacent said writing surface of said disk when said disk and cover plate portion are partially submerged in light modulating fluid, drive means for rotating said disk mounted on said cover plate assembly, bearing means for said disk mounted on one surface of said cover plate portion, a mounting rim projecting from said one surface of said cover plate portion for mounting said cover plate assembly on said light output window, said rim including shoulder means defining a ledge engaging the peripheral edge portion of the side of said window facing said disk, spring clips for maintaining said cover plate assembly in engagement with said window, and spacer means for maintaining a predetermined space between said disk and said window, said method comprising:

assembling said cover plate assembly;

placing said cover plate assembly horizontally with said mounting rim and bearing means extending upwardly from said cover plate portion;

placing said disk on said bearing means with said disk substantially parallel to said cover plate portion and with said rim surrounding said disk;

engaging said peripheral ring gear of said disk with said drive means;

placing said window on said rim shoulder means with one surface of said window facing and spaced from the other surface of said disk; and applying said spring clips to apply clamping pressure on the other surface of said cover plate portion and the other surface of said window to maintain said cover plate assembly engaged with said window, said rim, cover plate portion, and window substantially protecting said disk from contamination.

21. A method as recited in claim 20, wherein said cover plate portion includes an aperture for permitting passage of an electron beam to said one surface of said disk, and wherein a cover diaphragm dimensioned to cover said aperture is loosely pivoted on said cover plate portion at a point below the bulk of said aperture when said cover plate portion is disposed in operating position, said method further comprising the step of:

pivoting said cover diaphragm over said aperture to protect said disk from contamination during assembly; and following said application of said spring clips, moving said disk assembly to its operating position, said cover diaphragm thereafter being pivoted to uncover said aperture.

22. A method of assembling a light valve disk assembly, comprising:

mounting a disk having at least one writing surface, adapted to support a layer of light modulating fluid on said writing surface, for rotation within a cover plate assembly, said cover plate assembly being adapted to hydrodynamically isolate a surface of said disk from light modulating fluid in a sump; and mounting said cover plate assembly on a light output window facing the other surface of said disk.

23. A method as recited in claim 22, wherein said cover plate assembly comprises a mounting shoulder lying in a plane spaced in close proximity to the other surface of said disk, and wherein said cover plate assembly is mounted on said light output window by abutting the side of said light output window facing said disk against said mounting shoulder and clamping said light output window against said shoulder.

24. A light valve disk assembly comprising:

a rotatable disk having at least one writing surface and adapted to support a layer of light modulating fluid on said writing surface;

means mounting said disk for rotation on a cover plate assembly facing said one surface of said disk;

means for mounting said cover plate assembly on a light output window facing the other surface of said disk comprising a mounting shoulder lying in a plane spaced in close proximity to said other surface of said disk; and means clamping said light output window against said mounting shoulder.

* * * * *